US012601291B2

(12) United States Patent
Bacic et al.

(10) Patent No.: US 12,601,291 B2
(45) Date of Patent: Apr. 14, 2026

(54) HYDROGEN FUELLED GAS TURBINE ENGINE

(71) Applicant: ROLLS-ROYCE plc, London (GB)

(72) Inventors: Marko Bacic, Derby (GB); Rory D. Stieger, Derby (GB); Mark D. Taylor, Derby (GB); Chloe J. Palmer, Derby (GB); Kenneth J. Young, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/983,655

(22) Filed: Dec. 17, 2024

(65) Prior Publication Data

US 2025/0230768 A1 Jul. 17, 2025

(30) Foreign Application Priority Data

Jan. 17, 2024 (GB) ...................................... 2400631

(51) Int. Cl.
*F02C 7/22* (2006.01)
*F02C 3/22* (2006.01)
*F23R 3/28* (2006.01)

(52) U.S. Cl.
CPC .................. *F02C 3/22* (2013.01); *F02C 7/22* (2013.01); *F23R 3/28* (2013.01)

(58) Field of Classification Search
CPC .. F02C 7/22; F02C 7/222; F02C 7/232; F02C 7/236; F02C 9/263; F02C 9/26; F02C 9/28; F23R 3/36
See application file for complete search history.

(56) References Cited

U.S. PATENT DOCUMENTS

| | | | | | |
|---|---|---|---|---|---|
| 2,917,067 | A | * | 12/1959 | Pearl | F02C 7/232 |
| | | | | | 236/92 R |
| 9,353,688 | B2 | * | 5/2016 | Futa | F02C 7/22 |
| 10,989,117 | B2 | * | 4/2021 | Roberge | F02C 3/22 |
| 11,821,366 | B2 | * | 11/2023 | Miller | F02C 7/224 |
| 2014/0007584 | A1 | * | 1/2014 | Hong | F02C 9/26 |
| | | | | | 60/776 |
| 2016/0025339 | A1 | * | 1/2016 | Kamath | F02C 3/04 |
| | | | | | 60/39.12 |
| 2018/0372006 | A1 | * | 12/2018 | Chalaud | F02C 9/38 |

(Continued)

FOREIGN PATENT DOCUMENTS

| | | | |
|---|---|---|---|
| WO | 2022263307 | A1 | 12/2022 |
| WO | 2023118743 | A1 | 6/2023 |

OTHER PUBLICATIONS

Great Britain search report dated Sep. 11, 2024, issued in GB Patent Application No. 2400631.4.

(Continued)

*Primary Examiner* — Thuyhang N Nguyen

(57) ABSTRACT

A fuel system for a gas turbine engine configured to combust hydrogen fuel is disclosed. The fuel system comprises a main fuel conduit and a fuel pump configured to operate on liquid hydrogen within the fuel conduit to provide pressurised fuel to a combustor of the gas turbine engine. A fuel metering unit is configured to control fuel flow delivered to the combustor. The fuel pump is configured to provide hydrogen at an outlet above a critical temperature and pressure, to thereby provide supercritical hydrogen fuel downstream. The fuel metering unit is configured to provide a variable flow area downstream of the pump, to deliver fuel at required flow parameters.

15 Claims, 5 Drawing Sheets

(56)         References Cited

U.S. PATENT DOCUMENTS

| 2022/0195928 | A1 | 6/2022 | Johnson et al. | |
| 2023/0212983 | A1* | 7/2023 | Sibilli | F02C 3/20 |
| | | | | 60/730 |

OTHER PUBLICATIONS

European search report dated Apr. 24, 2025, issued in EP Patent Application No. 24215297.3.

* cited by examiner

HYDROGEN FUELLED GAS TURBINE ENGINE

CROSS-REFERENCE TO RELATED APPLICATIONS

This specification is based upon and claims the benefit of priority from United Kingdom Patent Application Number GB 2400631.4 filed on Jan. 17, 2024, the entire contents of which is incorporated herein by reference.

BACKGROUND

Technical Field

This disclosure relates to a fuel system for a hydrogen fueled gas turbine engine, a gas turbine engine including such a fuel system, aircraft comprising such engines, and methods of controlling such fuel systems and engines.

Description of the Related Art

Hydrogen fueled aircraft have been proposed, in which the hydrogen is stored in the form of a liquid, in order to improve density of the fuel. However, pumping the hydrogen at the necessary temperature, pressure and flow rate required by the engine is challenging.

SUMMARY

In a first aspect, there is provided a fuel system for a gas turbine engine configured to combust hydrogen fuel, the fuel system comprising:

a main fuel conduit;

a fuel pump configured to operate on liquid hydrogen within the fuel conduit to provide pressurised fuel to a combustor of the gas turbine engine;

a fuel metering unit configured to control fuel flow delivered to the combustor; wherein the fuel pump is configured to provide hydrogen at an outlet above a critical temperature and pressure, to thereby provide supercritical hydrogen fuel downstream; and the fuel metering unit is configured to provide a variable flow area downstream of the pump, to deliver fuel at required flow parameters.

Advantageously, the fuel system pumps hydrogen to provide supercritical fuel downstream of the pump. The inventors have found that such hydrogen can be combusted directly in the gas turbine engine combustor, without a requirement for further conditioning, such as heating or pressurising at the supercritical condition.

The critical temperature may be greater than or equal to 33 Kelvin (K). The critical pressure may be greater than 13 Bar.

The fuel metering unit may comprise a throttle valve configured to provide a variable pressure reduction between an inlet and an outlet.

The fuel system may be configured to provide a maximum pre-combustion enthalpy at the outlet of the fuel pump.

The fuel metering unit may comprise one of a globe valve and a cone valve.

The fuel metering unit may comprise a plurality of throttle valves.

The fuel system may comprise a plurality of fuel injector passages coupled to the fuel conduit via a fuel manifold. Each fuel injector passage may comprise a respective throttle valve. The inventors have found that, at the low temperatures at which the fuel is provided, there is a high sensitivity of density changes for a given temperature change. Consequently due to uneven heat pickup from the exit of the metering valve through to individual the burner orifices, there may be significant variation in individual burner flows. It is therefore advantageous to provide separate throttle valves for each fuel injector to ensure the equal distribution of flows in the combustor.

The fuel system may comprise a controller configured to control the pump and fuel metering unit.

The controller may be configured to control the pump and fuel metering unit to provide a target fuel pressure and temperature, which target fuel temperature and pressure is above a critical temperature and pressure, and varies in accordance with a schedule set in accordance with a fuel flow demand set point.

The controller may be configured to control the pump to provide a pressure to the fuel metering unit sufficient to allow for a required fuel flow and pressure at the combustor.

The controller may be configured to control the fuel metering unit in accordance with a schedule in accordance with a fuel mass-flow demand setpoint.

The schedule may comprise inputs comprising the fuel mass-flow demand setpoint, static pressure upstream and downstream of the fuel metering unit, and temperature upstream of the fuel metering unit, and an output comprising a valve position setpoint.

The fuel pump may be coupled to an electric motor.

The fuel system may comprise a fuel storage unit configured to store liquid hydrogen.

The fuel storage unit may be configured to store hydrogen as a liquid at a temperature of less than 30 Kelvin (K), and may be configured to store hydrogen at a temperature less than 25K, and may be configured to store hydrogen at a pressure of between 1 and 4 Bar.

The fuel pump may be configured to provide a maximum absolute pressure of between 13 Bar and =150 Bar.

In a second aspect there is provided a gas turbine engine comprising the fuel system of the first aspect.

In a third aspect there is provided an aircraft comprising a gas turbine engine of the second aspect.

In a fourth aspect, there is provided a method of operating a fuel system of the first aspect, the method comprising:

providing liquid hydrogen at an inlet to the fuel pump;

controlling, by a controller of a fuel system, the fuel pump to provide supercritical fuel at an output of the fuel pump; and controlling, by the controller, the fuel metering unit to provide a required pressure and mass-flow rate to a gas turbine engine combustor of the gas turbine engine.

BRIEF DESCRIPTION OF THE DRAWINGS

An embodiment will now be described by way of example only with reference to the accompanying drawings, which are purely schematic and not to scale, and in which.

DETAILED DESCRIPTION

Figure 1:
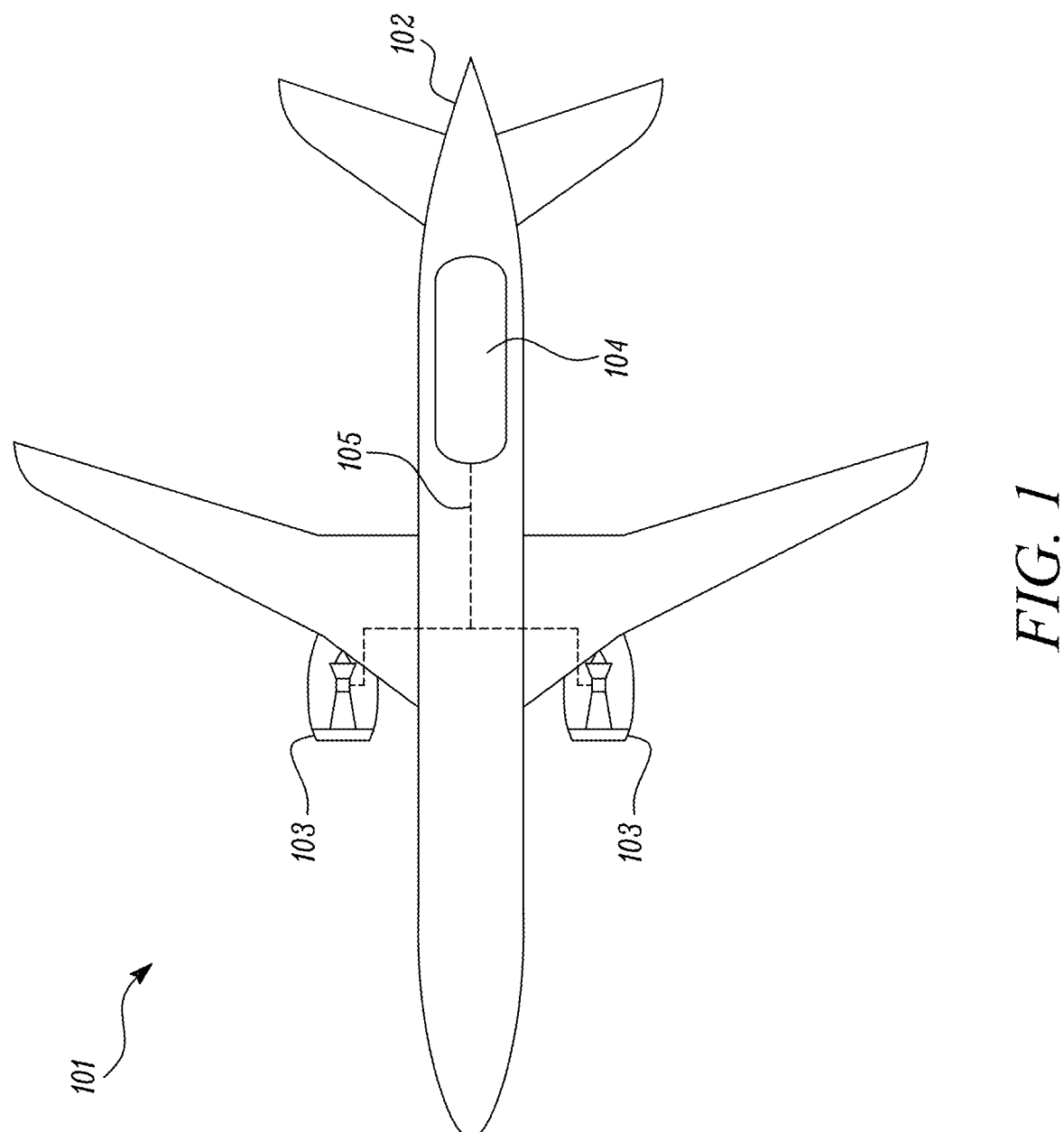
FIG. 1 shows an airliner comprising a hydrogen powered gas turbine engine.

A cryogenic hydrogen fueled airliner is illustrated in FIG. 1. In this example, the airliner 101 is of substantially conventional tube-and-wing twinjet configuration with a central fuselage 102 and substantially identical engines 103 which are mounted in an underwing configuration.

A cryogenic fuel storage system 104 is located in the fuselage 102 and is connected to the engines 103 via a fuel delivery system 105.

The cryogenic fuel is hydrogen stored as a liquid, below its boiling point. In a specific embodiment, the cryogenic fuel storage system 104 is configured to store the hydrogen fuel at 25 kelvin. In the present embodiment, the hydrogen fuel is pressurised to a pressure from 1 to 3 bar, and in a specific example, 2 bar. It will be appreciated that the principles of the present disclosure may be extended to hydrogen fuel stored at higher pressures and/or temperatures, and may be applicable to hydrogen stored as either a compressed gas or a supercritical fluid.

Figure 2:
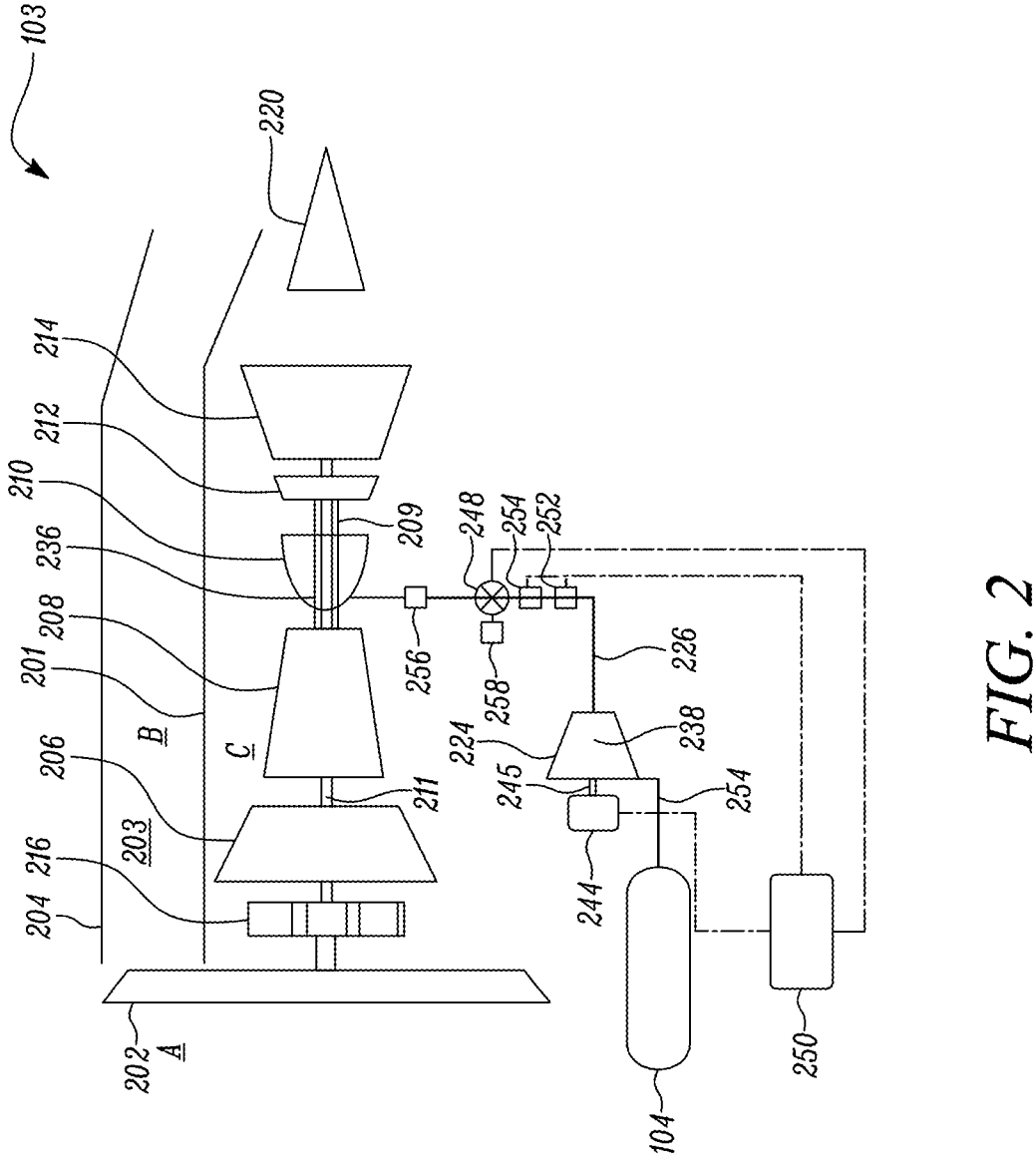
FIG. 2 shows a fuel system and gas turbine engine of FIG. 1.

A block diagram of one of the engines 103 is shown in FIG. 2.

In the present embodiment, the engine 103 is a turbofan comprising a ducted fan 202 located in a nacelle 204. The fan 202 receives intake air A and generates two airflows: a bypass flow B which passes axially through a bypass duct 203 and a core flow C which enters the gas turbine core 201.

The gas turbine core 201 comprises, in axial flow series, a low-pressure compressor 206, a high-pressure compressor 208, a combustor 210, a high-pressure turbine 212, and a low-pressure turbine 214.

In operation, the core flow C is compressed by the low-pressure compressor 206 and is then directed into the high-pressure compressor 208 where further compression takes place. The compressed air exhausted from the high-pressure compressor 208 is directed into the combustor 210 where it is mixed with fuel and the mixture is combusted.

Following combustion, the resultant hot combustion products are discharged from the combustor 210 and expand through, and thereby drive, the high-pressure turbine 212 and in turn the low-pressure turbine 214.

The fan 202 is driven by the low-pressure turbine 214 via a reduction gearbox 216. In the present embodiment, the reduction gearbox 216 takes the form of an epicyclic gearbox. In alternative arrangement, the gearbox may be omitted and the engine 103 configured as a direct-drive engine, either in a two-spool or three-spool arrangement.

Turning now to the hydrogen fuel flow, hydrogen fuel from the hydrogen storage system 104 is provided to a high-pressure fuel pump 224 via a hydrogen fuel conduit 226, shown by the dashed line in FIG. 2. Fuel upstream of the high-pressure pump 224 is generally in a liquid state. One or more separate low-pressure pumps (not shown) may also be provided upstream of the high-pressure pump 224. Though the hydrogen fuel pump 224 is shown as a single component in FIG. 2, it will be appreciated that the hydrogen fuel pump may comprise a plurality of stages, each config-ured to raise the pressure of the fuel for delivery to a subsequent stage.

The fuel pump 224 comprises a liquid hydrogen pump configured to operate on liquid hydrogen supplied from the tank 104 via the conduit 226 to provide an absolute fuel pressure at an outlet thereof of between 13:1 and 100:1 or higher during engine running conditions. As will be appreciated, the liquid hydrogen pump will increase both the temperature and the pressure of the hydrogen as work is performed on the fluid. The liquid hydrogen pump is con-figured to increase the temperature of the hydrogen at the pump outlet to a temperature greater than the critical tem-perature at the pressure at the pump outlet, for example, 33 Kelvin (K).

As will be appreciated, depending on the pump type, outlet pressure can be varied by for example varying pump inlet or outlet variable geometry (e.g. throttling, variable inlet stator vanes etc), by varying pump speed and/or having spill-over loops. Examples of suitable pumps include multi-stage axial flow flows, centrifugal pumps, pitot type pumps, gear pumps, roots-type pumps and piston pumps.

In the present example, the liquid hydrogen pump com-prises a multi-stage centrifugal hydrogen pump comprising a plurality of centrifugal pump stages. Only one stage is shown however for clarity The pump 224 is driven by an electrical motor 244 via a shaft 245, and controlled by a controller 250, which is in signal communication with a plurality of sensors 252, 254, 256, and a metering valve 248 provided downstream of the pump 224.

The sensors comprise a first static pressure sensor 252 and a temperature sensor 254 provided upstream in hydrogen fuel flow of the pump 224 metering valve 248, and a second static pressure sensor 254 provided downstream in hydrogen fuel flow of the pump 224 and metering valve 248. In other embodiments, different sensors may be provided as will be understood by the skilled person to provide for the control scheme described below. For instance, flow rates may be directly measured through flow meters such is Coriolis flow meter, vortex flow meter, fluidic flow meter or other methods The valve 248 comprises a throttle valve configured to operate on supercritical flow to moderate the mass flow rate of hydrogen fuel flowing therethrough. Examples of suitable valves include globe valves and cone valves.

It should be noted that maximum enthalpy of the pre-combusted fuel flow is provided at an outlet of the pump 224, i.e. no further work is performed on the fluid down-stream of the pump 224 before injection into the core combustor 236. In particular, no additional heating means such as a pre-heater is required, since the hydrogen is to be injected into the combustor 236 at a low temperature, in a supercritical state.

Figure 3:
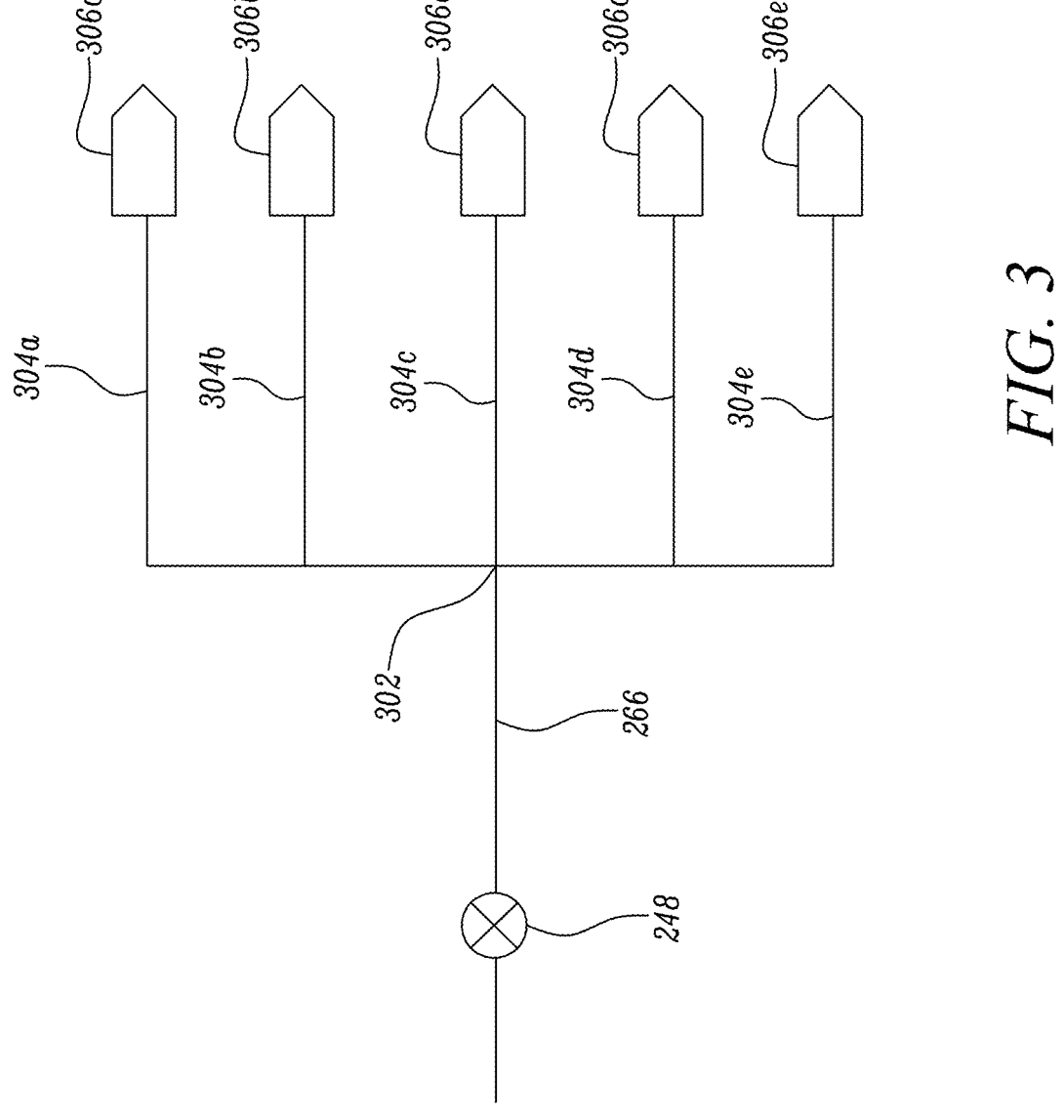
FIG. 3 shows part of the fuel system of FIG. 2.

FIG. 3 illustrates a part of the fuel system in further detail. As can be seen, the fuel conduit 226 communicates with a manifold 302, which in turn communicates with a plurality of fuel injector passages 304a-e. Each fuel injector passage 304a-e terminates in a respective fuel injector 306a-e, which in turn provide fuel to the combustor 236. As can be seen in FIG. 3, a single metering valve 248 controls flow to all of the injectors 306a-e. as will be appreciated, more or fewer injectors may be provided, depending on details of the engine installation.

In some cases however, additional metering valves may be required. For example, due to the internal geometry of the valve 248 and effects such as turbulence and boundary layer effects, a temperature gradient may be present within the manifold, which may result in different density of fuel within the different passages 306a-e. Supercritical hydrogen has high sensitivity of density changes relative to tempera-ture when at low temperatures, where $$\frac{\partial \rho}{\partial T}$$

may be greater than 2 kilograms per cubic metre Kelvin ($kg^3K^{-1}$). As such, any temperature variation between the passages may result in significant over or under fueling, and so heat spots within the engine.

Figure 4:
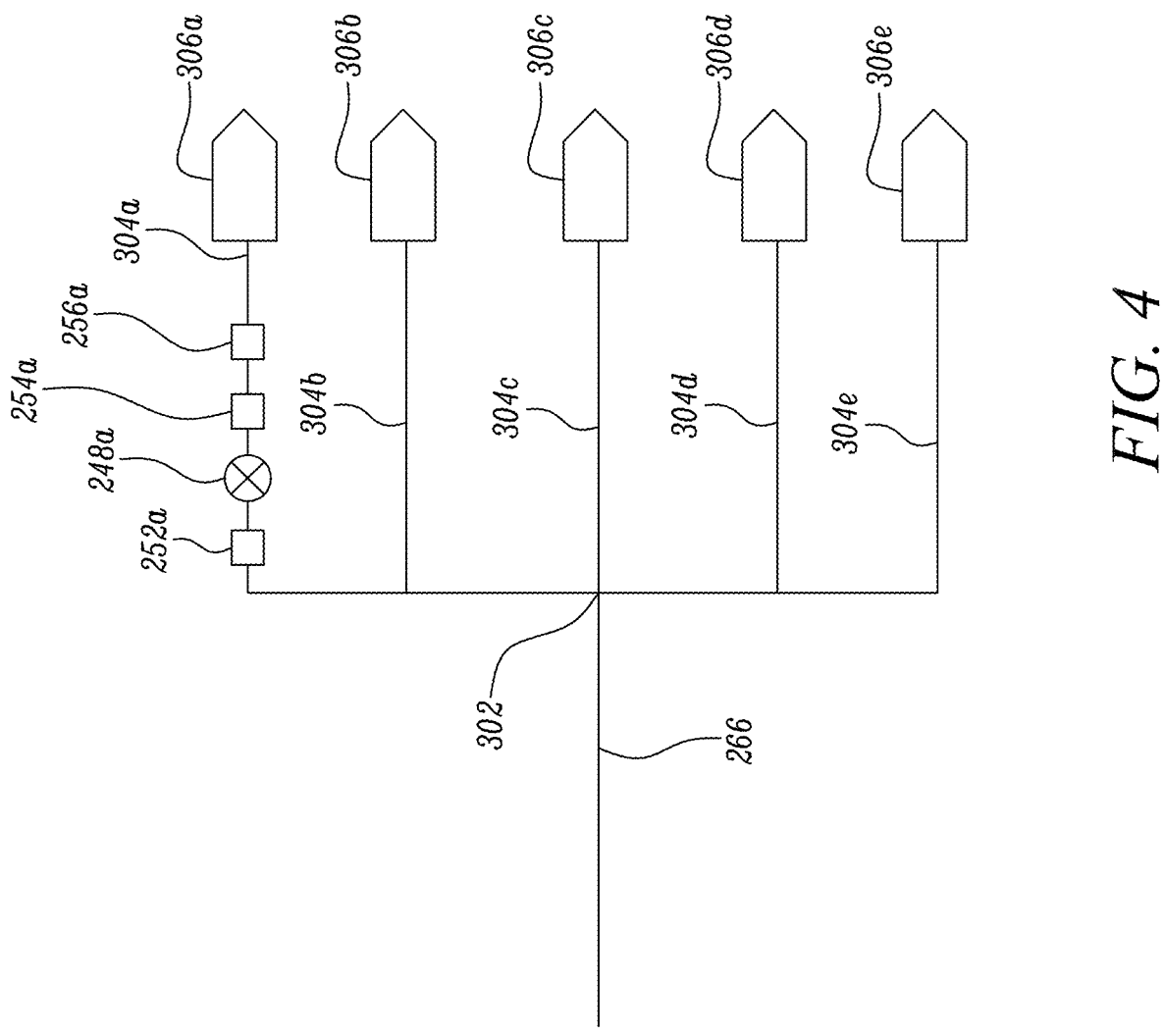
FIG. 4 shows part of an alternative fuel system for the gas turbine engine of FIG. 1.

FIG. 4 illustrates an alternative configuration of part of the fuel system. In this embodiment, a plurality of metering valves 248a are provided, one for each injector 306a. The metering valves 248a-e are located within a respective injector passage 304a-e, close to the respective injector 306a-e. Only the first set of valves 248a and sensors 252a, 254a, 256a are shown in FIG. 4 for clarity, though it will be understood that corresponding valves and sensors will be provided in a similar manner for each injector 306b-e. Respective pressure and temperature sensors 252a-e, 254a-e, 256a-e are also provided, arranged as in the previous embodiment. Each valve 248a-e and sensor 252a-e, 254a-e, 256a-e is coupled to the controller 250, and the system is controlled in a similar manner to the previous embodiment, with fuel normally being scheduled equally for each injector, but taking into account any fuel density discrepancies detected by the sensors 252a-e, 254a-e, 256a-e.

Figure 5:
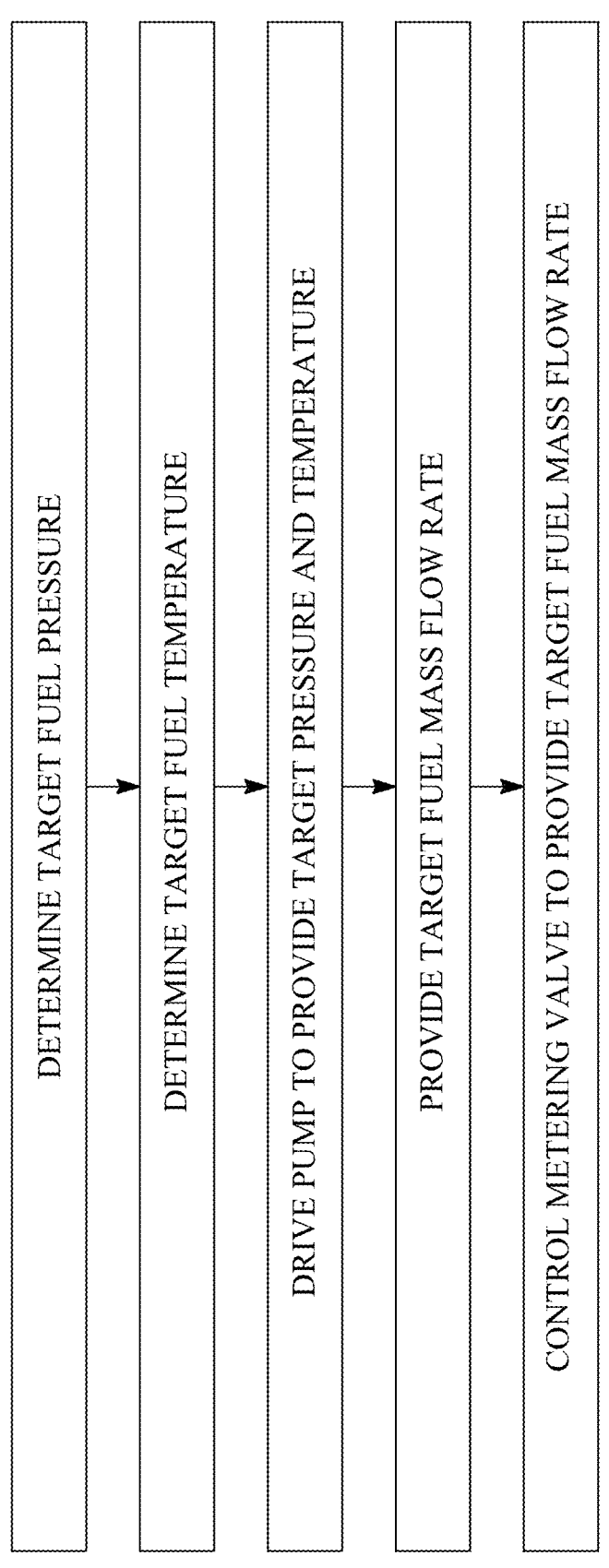
FIG. 5 shows a first control method for operating the fuel system of FIG. 2.

FIG. 5 illustrates a method of controlling the fuel system to provide for thrust control of the engine.

As previously described, the fuel system is provided with liquid hydrogen flow at the high-pressure fuel pump 224 inlet, which provides pressurised, heated hydrogen in a supercritical state. As will be understood, the term "supercritical fluid" refers to a fluid at a temperature and pressure above its critical point, where distinct liquid and gas phases are not present.

In order to deliver hydrogen fuel to the gas turbine engine to provide necessary thrust control, three conditions must be met-pressure, temperature and mass flow rate. Firstly, a minimum pressure and temperature must be maintained the hydrogen in a supercritical condition. Secondly, a minimum temperature to enable combustion must be achieved. The inventors have found that the minimum temperature required for combustion in a gas turbine engine core combustor can be as low as 33 K. A minimum absolute pressure must also be maintained to ensure that a positive pressure gradient is provided between the fuel in the fuel conduit 226 and airflow in the combustor 236, otherwise backflow will occur. As will be understood, the absolute pressure within the combustor will depend on the Overall Pressure Ratio (OPR) of the engine at the engine thrust condition, and the external ambient pressure. For example, for an engine with an OPR of 50:1 operating at maximum take-off thrust at sea level (with an ambient pressure of 1 Bar), the pressure within the combustor is 50 Bar. As will be appreciated, some pressure loss is encountered in the fuel injectors, and so pressure ratio across the injectors is required (typically 1.2 to 1.5, and in one example, 1.3) to force fuel through the injectors at the required rate. Consequently, a pressure within the fuel conduit of up to 150 Bar may be required for high OPR engines.

In a first step therefore, a target fuel delivery pressure is ascertained. This target fuel delivery pressure may be calculated from a target or current engine OPR and ambient pressure, with an additional factor to account for pressure losses in the injectors. At all operating points, the target pressure is required to be above a minimum fuel delivery pressure necessary to maintain the fuel within the metering valve 248 above the critical pressure.

In a second step, a target fuel delivery temperature is ascertained. The target fuel delivery temperature is the highest of a hydrogen critical temperature necessary to maintain hydrogen downstream of the pump 224 in a supercritical state, and the minimum combustion temperature at which combustion can reliably take place in the combustor.

In a third step, the electric motor 244, or other drive means (or variable geometry where present) is operated such that the pump 224 delivers the target pressure and temperature at the pump outlet. The pump outlet pressure and temperature are measured by the sensors 252, 254, and the pump is controlled via the controller 250 in accordance with a suitable control methodology. Suitable methodologies will be known to the person skilled in the art of control systems, and include Proportional, Integral, Derivative (PID) control for example, or other open, closed loop or model based control strategies.

The metering valve 248 is controlled to ensure sufficient mass-flow is delivered to the engine, in accordance with a thrust demand signal. As will be appreciated, gas turbine engine thrust is generally controlled by modulating fuel flow, with increased fuel flow being correlated with increased thrust delivery. Consequently, in a fourth step, a target mass-flow is ascertained in accordance with an engine model and a thrust demand signal.

The valve 248 is then controlled to deliver the target mass-flow in a fifth step. Current mass-flow can be determined using closed loop control, utilising the static pressure measurements upstream and downstream of the valve 248 using sensors 252, 256, and the upstream temperature sensor 254. A valve position sensor 258 can be utilised to determine current valve position and therefore valve area. Once valve area, pressure drop and temperature are determined, the mass-flow can be calculated using compressible flow equations. A difference between the current mass-flow and target mass-flow represents a setpoint delta. A control loop (which again may comprise any suitable control algorithm such as PID control) can be utilised to minimise the setpoint delta.

As such, engine mass-flow can be delivered at a required temperature, pressure and flow rate using only a pump and metering valve, with no additional heating means being provided. Additionally, the system can be controlled using only three sensors 252, 254, 256, while providing full temperature, pressure and mass flow rate control.

Alternative embodiments can be envisaged. For example, the fuel turbine may comprise multiple stages coupled to respective stages of the fuel pump in a similar manner to the multiple compressor and turbine stages of the gas turbine engine. The hydrogen fuel could be stored as a low temperature gas or supercritical fluid. Other control schemes could be envisaged, such as model-based control.

The invention claimed is:

1. A fuel system for a gas turbine engine configured to combust hydrogen fuel, the fuel system comprising:
   a main fuel conduit;
   a fuel pump configured to operate on liquid hydrogen within the fuel conduit to provide pressurised fuel to a combustor of the gas turbine engine;
   a fuel metering unit configured to control fuel flow delivered to the combustor;
   a controller configured to control the fuel pump and the fuel metering unit wherein
   the fuel pump is configured to provide hydrogen at an outlet above a critical temperature and pressure, to thereby provide supercritical hydrogen fuel downstream;
   the fuel metering unit is configured to provide a variable flow area downstream of the pump, to deliver fuel at required flow parameters;

the controller is configured to control the fuel metering unit in accordance with a schedule in accordance with a fuel mass-flow demand setpoint; and the schedule comprises inputs comprising the fuel mass-flow demand setpoint, static pressure upstream and downstream of the fuel metering unit, and temperature upstream of the fuel metering unit, and an output comprising a valve position setpoint.

2. The fuel system according to claim 1, wherein critical temperature is greater than or equal to 33 Kelvin (K).

3. The fuel system according to claim 1, wherein the critical pressure is greater than 13 Bar.

4. The fuel system according to claim 1, wherein the fuel metering unit comprises a throttle valve configured to provide a variable pressure reduction between an inlet and an outlet.

5. The fuel system according to claim 1, wherein the fuel system is configured to provide a maximum pre-combusted fuel enthalpy at the outlet of the fuel pump.

6. The fuel system according to claim 1, wherein the fuel metering unit comprises one of a globe valve and a cone valve.

7. The fuel system according to claim 1, wherein the fuel metering unit comprises a plurality of throttle valves.

8. The fuel system according to claim 7, wherein the fuel system comprises a plurality of fuel injector passages coupled to the fuel conduit via a fuel manifold.

9. The fuel system according to claim 8, wherein each fuel injector passage comprise a respective throttle valve.

10. The fuel system according to claim 1, wherein the controller is configured to control the pump and fuel metering unit to provide a target fuel pressure and temperature, which target fuel temperature and pressure is above a critical temperature and pressure, and varies in accordance with a schedule set in accordance with a fuel flow demand set point.

11. The fuel system according to claim 10, wherein the controller is configured to control the pump to provide a pressure to the fuel metering unit sufficient to allow for a required fuel flow and pressure at the combustor.

12. The fuel system according to claim 1, wherein the fuel system comprise a fuel storage unit configured to store liquid hydrogen at a temperature of less than 30 Kelvin (K), and may be configured to store hydrogen at a temperature less than 25K, and may be configured to store hydrogen at a pressure of between 1 and 4 Bar.

13. The fuel system according to claim 1, wherein the fuel pump is configured to provide a maximum absolute pressure of between 13 Bar and 150 Bar.

14. A gas turbine engine comprising a fuel system according to claim 1.

15. A method of operating a fuel system according to claim 1, the method comprising:

providing liquid hydrogen at an inlet to the fuel pump;

controlling, by a controller of the fuel system, the fuel pump to provide supercritical fuel at an output of the fuel pump; and controlling, by the controller, the fuel metering unit to provide a required pressure and mass-flow rate to a gas turbine engine combustor of the gas turbine engine.

\* \* \* \* \*